(12) United States Patent
Nakano

(10) Patent No.: US 6,868,336 B1
(45) Date of Patent: Mar. 15, 2005

(54) NAVIGATION APPARATUS

(75) Inventor: Masahiko Nakano, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 10/434,348

(22) Filed: May 9, 2003

(30) Foreign Application Priority Data

May 13, 2002 (JP) .................................... 2002-137430

(51) Int. Cl.[7] .......................................... G01C 21/00
(52) U.S. Cl. ...................................... 701/208; 701/211
(58) Field of Search ............................ 701/200, 208, 701/211, 212; 340/990, 995.1, 995.14, 995.15

(56) References Cited

U.S. PATENT DOCUMENTS 5,884,217 A * 3/1999 Koyanagi .................. 701/208
6,202,026 B1 * 3/2001 Nimura et al. ............. 701/211

FOREIGN PATENT DOCUMENTS

JP  A 5-113343  5/1993

* cited by examiner

*Primary Examiner*—Yonel Beaulieu
(74) *Attorney, Agent, or Firm*—Oliff & Berridge, PLC (57) ABSTRACT

A map screen is displayed in a left half area of a display panel and an real image such as a satellite photograph depicting a surface of an earth and an aerial photograph is displayed in the remaining right half area thereof based on real image data. The real images on different scales (the image as the wide area display and the image as the detailed display) can be displayed in the right half area on the display panel. A default condition of two-screen display is set to display the real image as the wide area display in the right half area.

8 Claims, 7 Drawing Sheets

NAVIGATION APPARATUS

The present disclosure relates to the subject matter contained in Japanese Patent Application No. 2002-137430 filed on May 13, 2002, which is incorporated herein by reference in its entirety.

BACKGROUND OF THE INVENTION

1. Field of the Invention

The invention relates to a navigation apparatus and, more particularly, a navigation apparatus employing real image data that correspond to images such as a satellite photograph depicting the surface of the earth and an aerial photograph.

2. Description of the Related Art

In the related art, a navigation apparatus displays a map on a screen of a display device based on road map data recorded in the DVD-ROM, etc., displays own location on the map based on own location data, and guides a user onto routes to a destination.

However, in the navigation apparatus in the related art, the map screen to be displayed is formed by using map data. Therefore, there is such a problem that it is difficult to understand own current location and grasp the actual situation around own current location through the map screen.

This is because it is difficult to display the vertical positional relationship such as roads in a solid crossing, on the map screen and because actually a large number of roads, buildings, and the like that are not displayed on the map screen a re present.

As one of solutions for overcoming such problem, JP-A-Hei.5-113343 discloses that own current location is displayed on an aerial photograph screen that is prepared from aerial photograph data. If such aerial photograph screen is employed, the building or the like serving as a mark can be very easily understood. Thus, there are such advantages that own current location can be easily understood and also the actual situation around own current location can be easily grasped.

However, the aerial photograph screen (prepared by using the aerial photograph data) does not in all cases make it possible to understand own current location more easily and grasp the situation around own current location more easily in contrast to the map screen (prepared by using the map data). Rather, in some cases own current location can be easily understood using the map screen rather than the aerial photograph screen.

Also, the aerial photograph data employed to prepare the real image such as the aerial photograph screen need a large quantity of data. Thus, if the aerial photograph data are stored in the memory device, the compression process must be applied. Therefore, if the aerial photograph data are employed, the original aerial photograph data must be obtained by applying the restoration (depression, expansion) process to the aerial photograph data, which have been subjected to the compression process, to display the real image.

The restoration process is not carried out in an instant. For example, it takes almost several seconds to display a sheet of the aerial photograph screen on the screen of the display device. Therefore, there is such a problem that, unlike the map screen in the related art, the screen cannot be continuously updated so as to respond to the moving of own location.

In this manner, the aerial photograph screen is not superior in all respects to the map screen. As a result, it is supposed that not a navigation apparatus utilizing the aerial photograph screen only (of course, a navigation apparatus utilizing the conventional map screen only) but a navigation apparatus system utilizing both the aerial photograph screen and the map screen becomes the mainstream in the next generation.

Accordingly, in the future, it becomes important to use properly the real image such as the aerial photograph screen and the map screen, which have above two different features.

SUMMARY OF THE INVENTION

The invention has been made in view of the above problems, and it is an object of the invention to provide a navigation apparatus, which can enhance a degree of user's satisfaction using properly both a display of a real image such as an aerial photograph screen and a map screen prepared by using the map data.

In order to achieve the above object, according to a first aspect of the invention, a navigation apparatus includes a display unit and a display control unit. On the display unit, first and second areas are defined. The display control unit includes a first control section and controls the display unit to display at least one of a map screen and a real image, based on map data, real image data, and a present location. When a first instruction signal is input to the display control unit, the first display control section controls the display unit to display the map screen in the first area and the real image on one of first to n-th scales in the second area, where n is an integer not smaller than two.

Figure 8:
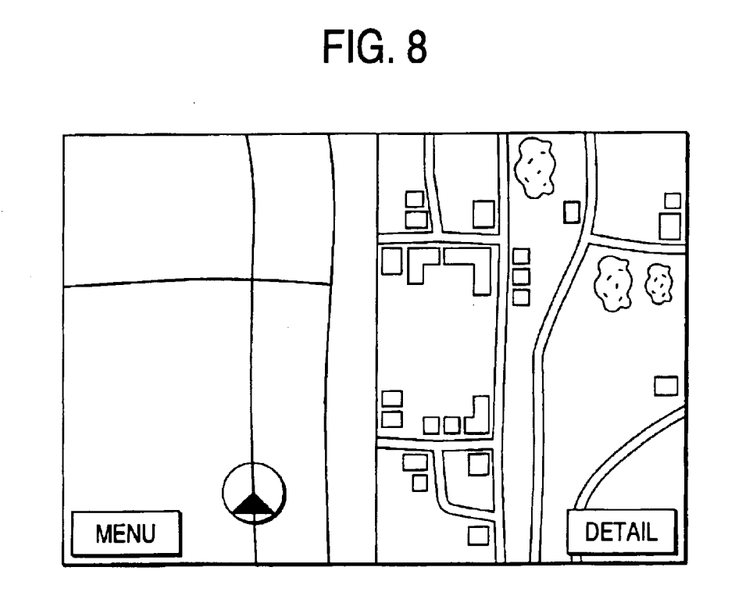
FIG. 8 is a view showing an example of a screen state displayed on the display panel of the navigation apparatus according to the embodiment (1) of the invention.

In the navigation apparatus, the map screen is displayed on the first area on the display unit, while the real image is displayed on the second area. For example, as shown in FIG. 8, the map screen can be displayed in the left half on the display screen, while the real image can be displayed in the remaining right half thereof. Therefore, not only the map screen but also the real image such as a satellite photograph can be displayed on the display screen. As a result, sufficient information can be offered to the user.

Also, the real image can be displayed on a plurality of scales different from each other (e.g., the image as the wide area display, and the image as the detailed display) in the second area. In addition, when a first instruction signal is input to the display control unit (for example, a user inputs "two screen display" instruction to the navigation apparatus), the first display control section controls the display unit to display the map screen in the first area and the real image on one of first to n-th scales (for example, the real image as the wide area display) in the second area.

Therefore, for example, when the display is switched from a state in which the map screen is displayed on the overall screen of the display screen (FIG. 6) to a state in which the map screen is displayed in the left half of the display screen and the real image is displayed in the remaining right half thereof, the real image having the one of the scales is displayed in the remaining right half thereof (FIG. 8).

Also, as described above, since the real images having different scales can be displayed in the second area, essentially the display control unit must receive from the user an instruction that instructs which scale should be selected to display the real image. However, in the navigation apparatus, since a default condition of display is set in the first display control section, the user is not requested to issue the instruction every time. Therefore, the navigation apparatus becomes very convenient in use for the user.

According to a second aspect of the invention, in the first aspect, the first area and the second area do not overlap each other.

According to a third aspect of the invention, in the first aspect, the one of the first to n-th scales is smaller than the other scales.

By the way, as explained in the above, the real image data such as the satellite photograph and the aerial photograph need a large quantity of data. Thus, if the real image data are stored in the memory device, the compression process must be applied. Therefore, if the real image data are employed, the original real image data must be obtained by applying the restoration (depression, expansion) process to the real image data, which have been subjected to the compression process, to display the real image.

Also, the restoration process is not carried out in an instant. For example, it takes almost several seconds to display a sheet of the aerial photograph screen on the screen of the display device. Therefore, unlike the map screen in the prior art, the screen cannot be continuously updated so as to correlate with the moving of own location.

Therefore, as shown in FIG. 8, in the case that the map screen is displayed in the left half on the display screen and the real image is displayed in the remaining right half, the map screen can be continuously updated so as to correlate with the moving of own location, nevertheless the screen of the real image cannot be continuously updated. That is, the real image is fixed.

Accordingly, if the real image having the large scale (i.e., the image as the detailed display) is displayed in the narrowed area such as the second area (e.g., the right half) on the display screen, an amount of the information that can be provided to the user becomes extremely small.

In contrast, according to the navigation apparatus, the real image on the one of the scales has the small scale relatively, and the real image as the wide area (not the real image as the detailed display) is displayed in the second area on the display screen. Therefore, even if the real image is displayed in the narrowed area such as the second area on the display screen, a large quantity of information can be provided to the user.

According to a fourth aspect of the invention, in any one of the first to third aspects, when a second instruction signal is input to the display control unit, the first display control section changes the scale of the real image displayed in the second area.

In the fourth aspect, when the instruction for switching the scale of the real image that is displayed in the second area is issued from the user, the real image having the scale that is different from the scale applied before switching is displayed in the second area. Therefore, the user can switch the scale of the real image as desired.

According to a fifth aspect of the invention, in any one of the first to fourth aspects, a third area is defined on the display unit. The display control unit further includes a second display control section. When a third instruction signal is input to the display control unit, the second display control section controls the display unit to display one of the map screen and the real image in the third area. When the display unit displays the one in the third area and a fourth instruction signal is input to the display control unit, the second display control section changes the one of the map screen and the real image to the other.

Figure 6:
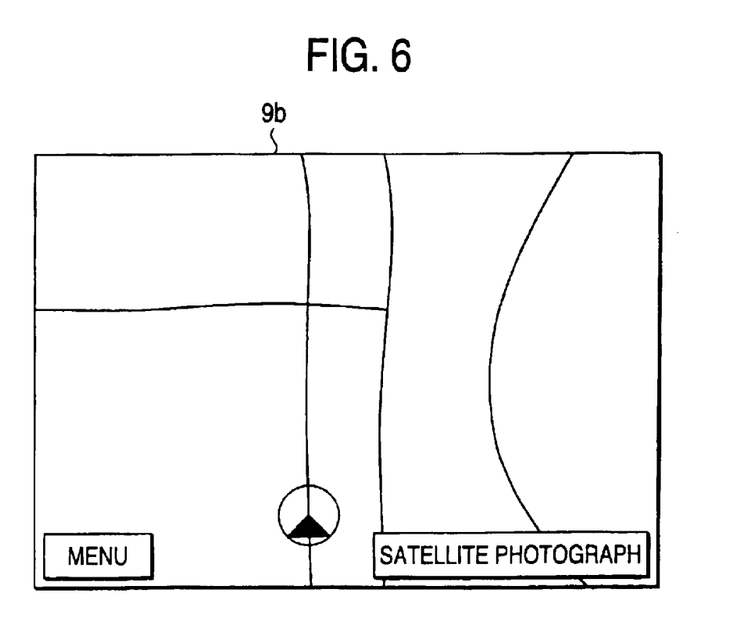
FIG. 6 is a view showing an example of a screen state displayed on the display panel of the navigation apparatus according to the embodiment (1) of the invention.
Figure 7:
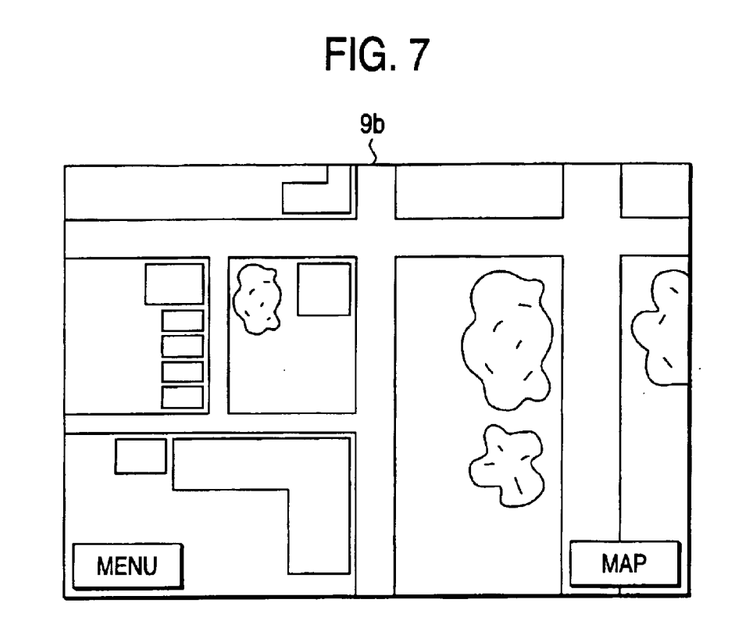
FIG. 7 is a view showing an example of a screen state displayed on the display panel of the navigation apparatus according to the embodiment (1) of the invention.

In the fifth aspect, the image displayed in the third area on the display screen can be switched from one of the map screen and the real image to the other. For example, when the map screen is displayed on the overall screen of the display screen (FIG. 6), the overall screen on the display screen can be switched from the map screen to the real image (FIG. 7).

According to a sixth aspect of the invention, in the fifth aspect, the third area contains the first and second areas.

According to a seventh aspect of the invention, in the fifth or sixth aspect, when the third instruction signal is input to the display control unit, the second display control section controls the display unit to display the real image on another of the first to n-th scales, which is different from the one of the first to n-th scales, in the third area.

Two types or more of real images having different scales (e.g., the image as the wide area display and the image as the detailed display) can be displayed in the third area. Also, a default condition of the display in the second display control section are set to display the real image having the second scale that is different from the one of the scales (e.g., the image as the detailed display) in the third area.

Therefore, if the display is switched from the state that the map screen is displayed in the overall screen of the display screen (FIG. 6) to the state that the real image is displayed on the overall screen of the display screen, the real image having the second scale is displayed in the overall screen on the display screen (FIG. 7).

Also, as described above, since two types or more of real images having different scales can be displayed in the third area, essentially the display control unit must receive from the user the instruction that instructs which scale should be selected to display the real image. However, in the navigation apparatus, since the default conditions of display in the second display controlling means are set, the user is not requested to issue the instruction every time. Therefore, the system becomes very convenient in use for the user. Further, the scale of the real image is different from the case where the real image is displayed in the second area on the display screen. Therefore, more significant information can be provided to the user.

According to an eighth aspect of the invention, in any one of the fifth to seventh aspects, when the display unit displays thereat image in the third area and a fifth instruction signal is input to the display control unit, the second display control section changes the scale of the displayed real image.

DETAILED DESCRIPTION OF THE PREFERRED EMBODIMENTS

Figure 1:
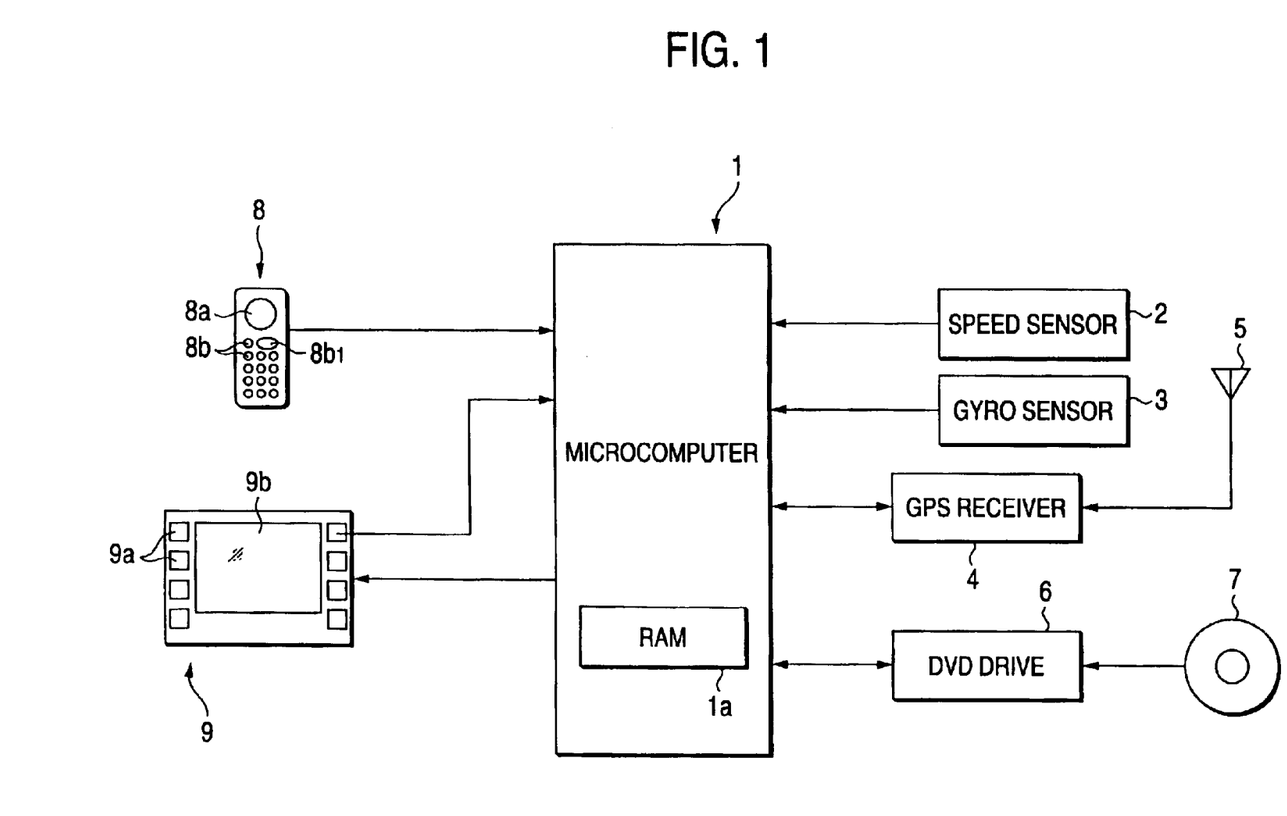
FIG. 1 is a block diagram showing schematically a pertinent portion of a navigation apparatus according to an embodiment (1) of the invention.

An embodiment of a navigation apparatus according to embodiments of the invention will be explained with reference to the drawings hereinafter. FIG. 1 is a block diagram showing schematically a pertinent portion of a navigation apparatus according to an embodiment (1).

A speed sensor 2 for acquiring information of the covered distance by executing a calculation based on a vehicle speed, and a gyro sensor 3 for acquiring information of the running direction are connected to a microcomputer 1. The microcomputer 1 can determine own vehicle location based on covered distance information and running direction information, both are calculated (self-contained navigation).

A GPS receiver 4 receives a GPS signal transmitted from a satellite via an antenna 5, and is connected to the microcomputer 1. The microcomputer 1 can determine own vehicle location based on the GPS signal (GPS navigation).

Also, a DVD drive 6 that can acquire map data and real image data from a DVD-ROM 7 (other storage devices are also available), in which the map data containing substantially the whole country are stored and also the real image data of the aerial photograph that depicts the surface of the earth are recorded with recorded areas are limited (e.g., major cities), is connected to the microcomputer 1. The microcomputer 1 reads necessary map data and real image data from the DVD-ROM 7 based on the own vehicle location, which has been determined, and then stores these data in a RAM 1a of the microcomputer 1.

Also, real image data on a scale of 1.4 m per pixel dot and real image data on a scale of 2.8 m per pixel dot are stored in the DVD-ROM 7 as the real image data of the satellite photograph that depicts the surface of the earth in the same area. When the real image is displayed as a wide-area display, the microcomputer 1 employs the real image data on the scale of 2.8 m per pixel dot, which is a small scale. Also, when the real image is displayed as a detailed display, the microcomputer 1 employs the real image data on the scale of 1.4 m per pixel dot, which is a large scale.

Also, the microcomputer 1 can display the map screen, on which the current location of own vehicle is displayed precisely, on a display panel 9b by combining the determined current location of the own vehicle and the map data (executing the map matching process). Also, a switch signal output from a joy stick 8a or a button switch 8b (e.g., a "two screen" button switch $8b_1$) provided on a remote controller 8 and a switch signal output from a button switch 9a provided on a display device 9 are input into the microcomputer 1. Then, processes are executed in the microcomputer 1 in response to these switch signals.

Also, a plurality of infrared LEDs and a plurality of phototransistors are arranged on the upper/lower and left/right sides of the display panel 9b to oppose to each other such that a position of the display panel 9b, on which the user's finger touches, can be detected. The microcomputer 1 can acquire the detected result.

Figure 2:
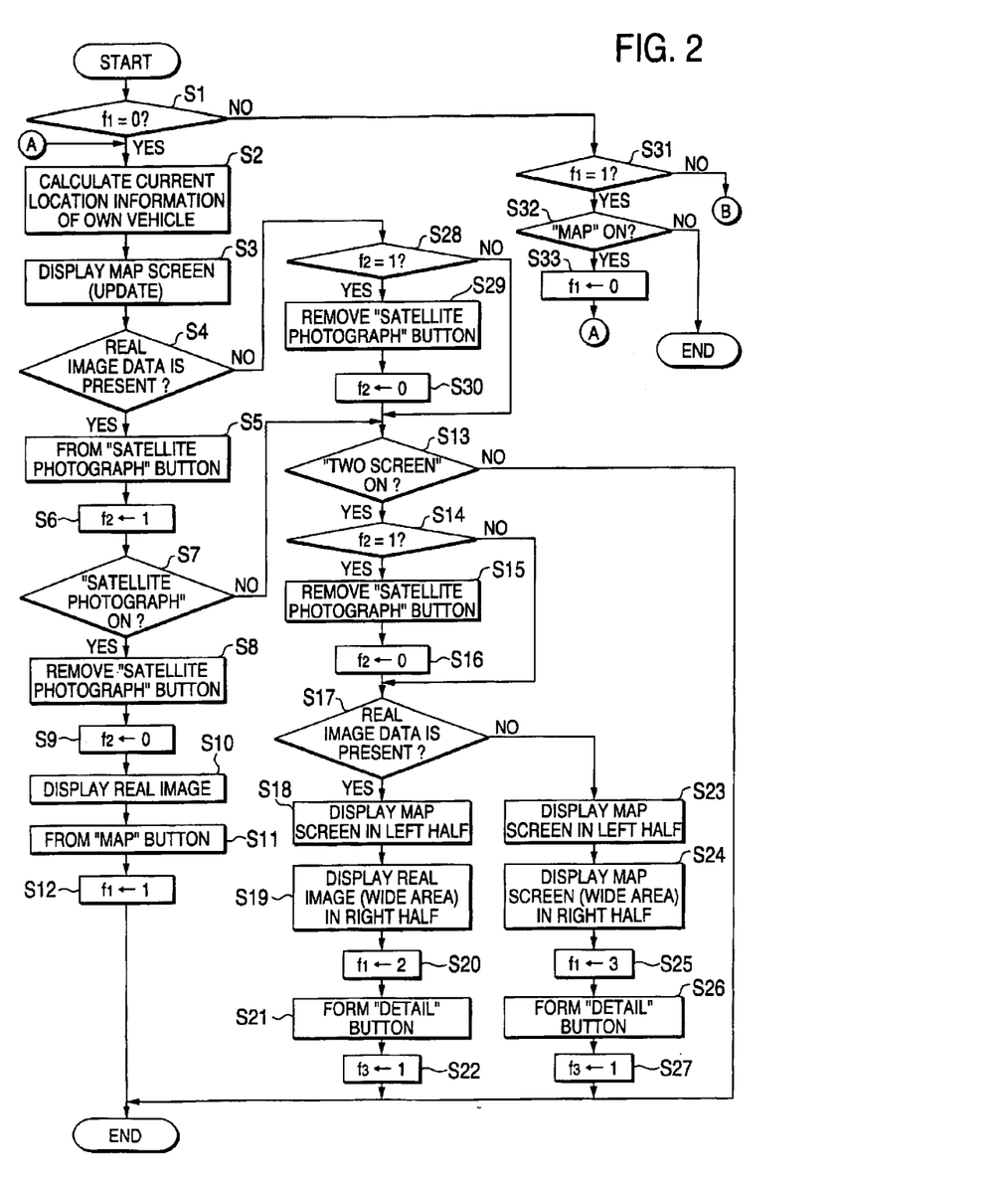
FIG. 2 is a flowchart showing processing operations executed by a microcomputer in the navigation apparatus according to the embodiment (1) of the invention.
Figure 3:
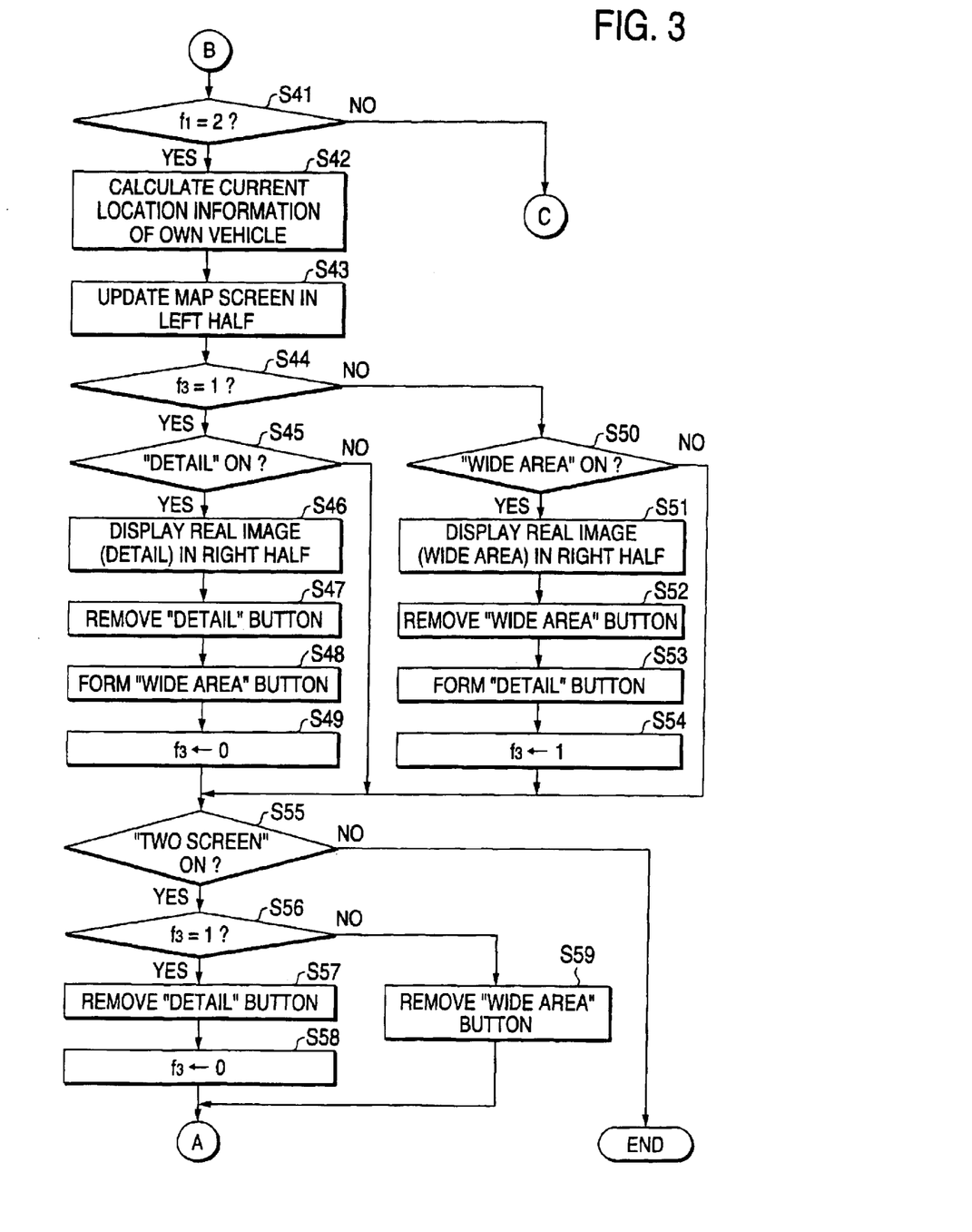
FIG. 3 is a flowchart showing processing operations executed by the microcomputer in the navigation apparatus according to the embodiment (1) of the invention.

Next, processing operations (1) executed by the microcomputer 1 in the navigation apparatus according to the embodiment (1) will be explained with reference to flow-charts shown in FIG. 2 to FIG. 4 hereinafter. First, it is decided whether or not a flag $f_1$ indicating the state of a screen that is displayed on the display panel 9b is 0 (step S1).

Figure 5:
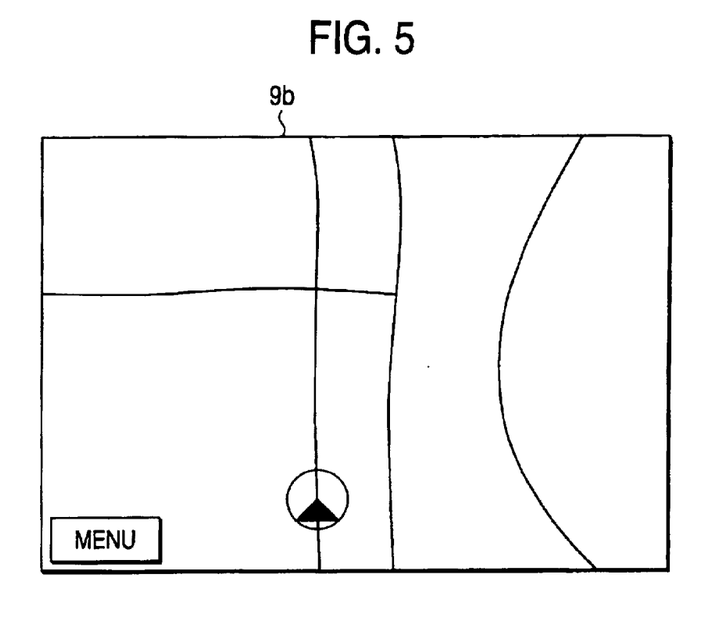
FIG. 5 is a view showing an example of a screen state displayed on a display panel of the navigation apparatus according to the embodiment (1) of the invention.

If it is decided that the flag $f_1$ is 0, then the current location of own vehicle is calculated from the GPS signal and the like. (step S2). Then, the map screen showing the neighborhood of the current location of own vehicle is displayed on the display map 9b based on the calculated current location of own vehicle and the map data stored in the RAM 1a (step S3) FIG. 5 is a view showing a state in which the map screen is displayed on the display panel 9b.

Then, based on the current location information of own vehicle and the real image data stored in the RAM 1a, it is decided whether or not the real image data of the neighborhood of the current location of own vehicle are present (step S4). If it is decided that the real image data are present, a "satellite photograph" button (touch switch) for allowing the user to instruct switching the display from the map screen to the satellite photograph (real image) is formed (step S5). Then, a flag $f_2$ indicating that the "satellite photograph" button is formed is set to 1 (step S6). FIG. 6 is a view showing the state that the "satellite photograph" button switch is formed on the display panel 9b.

Then, it is decided whether or not the user touches on the "satellite photograph" button switch (step S7). If it is decided that the user touches on the "satellite photograph" button switch, the "satellite photograph" button switch is removed (step S8). Then, the flag $f_2$ is set to 0 (step S9) Then, the real image indicating the neighborhood of the current location of own vehicle (as the detailed display) is displayed on the display panel 9b based on the calculated current location information of own vehicle and the real image data (on the scale of 1.4 m per pixel dot) stored in the RAM 1a (step S10). Then, a "map" button switch (touch switch) for allowing the user to instruct switching the display from the real image to the map screen is formed (step S11). Then, the flag $f_1$ is set to 1 (step S12). FIG. 7 is a view showing a state in which the real image is displayed on the display panel 9b.

In contrast, in step S7, if it is decided that the user does not touch on the "satellite photograph" button switch, it is decided whether or not the user pushes down a "two screen" button switch $8b_1$ provided on the remote controller 8 (step S13). If it is decided that the user pushes down the "two screen" button switch $8b_1$, it is decided whether or not the flag $f_2$ indicating that the "satellite photograph" button switch is formed is 1 (step S14).

If it is decided that the flag $f_2$ is 1 (i.e., the "satellite photograph" button switch is formed), the "satellite photograph" button switch is removed (step S15). Then, the flag $f_2$ is set to 0 (step S16). Then, the process goes to step S17. In contrast, if it is decided that the flag $f_2$ is not 1 (i.e., the "satellite photograph" button switch is not formed), there is no necessity that the "satellite photograph" button switch should be removed. Thus, the process goes to step S17 as it is.

In step S17, based on the current location information of own vehicle and the real image data stored in the RAM 1a, it is decided whether or not the real image data of the neighborhood of the current location of own vehicle are present. Then, if it is decided that the real image data are present, a map screen showing the neighborhood of the current location of own vehicle is displayed in a left half area of the display panel 9b based on the current location information of own vehicle and the map data stored in the RAM 1a (step S18). In addition, the real image showing the neighborhood of the current location of own vehicle (as the wide area display) is displayed in a right half area of the display panel 9b based on the current location information of own vehicle and the real image data (in the scale of 2.8 m per pixel dot) stored in the RAM 1a (step S19). The flag $f_1$ is set to 2 (step S20).

Then, a "detail" button switch (touch switch) for allowing the user to instruct switching the display from the real image as the wide area display to the real image as the detailed display is formed (step S21). Then, a flag $f_3$ indicating that the "detail" button switch is formed is set to 1 (step S22). FIG. 8 is a view showing a state in which the map screen is displayed in the left half of the display panel 9b and the real image is displayed in the remaining right half.

In contrast, in step 317, if it is decided that the real image data are not present, the map screen showing the neighborhood of the current location of own vehicle is displayed in the left half area of the display panel 9b based on the current location information of own vehicle and the map data stored in the RAM 1a (step S23). In addition, the map screen (as the wide area display) is displayed in the right half area of the display panel 9b (step S24). Then, the flag $f_1$ is set to 3 (step S25).

Figure 9:
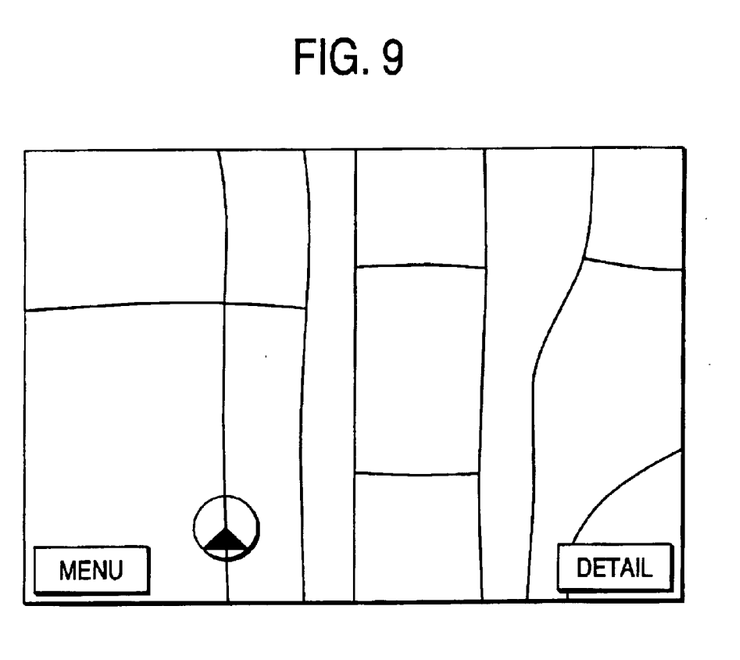
FIG. 9 is a view showing an example of a screen state displayed on the display panel of the navigation apparatus according to the embodiment (1) of the invention.

Then, the "detail" button switch (touch switch) for allowing the user to instruct switching the display from the map screen as the wide area display to the map screen as the detailed display is formed (step S26). Then, the flag $f_3$ indicating that the "detail" button switch is formed is set to 1 (step S27). FIG. 9 is a view showing a state in which the map screen is displayed in the left half area of the display panel 9b and the map screen as the wide area display is displayed in the remaining right half.

By the way, in step S4, if it is decided that the real image data are not present, it is decided whether or not the flag $f_2$ indicating the "satellite photograph" button switch is formed is 1 (step S28). Then, if it is decided that the flag $f_2$ is 1 (i.e., the "satellite photograph" button switch is formed), the "satellite photograph" button switch is removed (step S29). The flag $f_2$ is set to 0 (step S30). Then, the process goes to step S13. In contrast, if it is decided that the flag $f_2$ is not 1 (i.e., the "satellite photograph" button switch is not formed), there is no need that the "satellite photograph" button switch should be removed. Thus, the process goes to step S13 as it is.

Also, in step S1, if it is decided that the flag $f_1$ showing the state of the screen displayed on the display panel 9b is not 0, then it is decided whether or not the flag $f_1$ is 1 (step S31). Then, if it is decided that the flag $f_1$ is 1 (i.e., as shown in FIG. 7, the real image is displayed in the overall area of the display panel 9b), it is decided whether or not the user touches on the "map" button switch (step S32).

If it is decided that the user touches on the "map" button switch, the flag $f_1$ is set to 0 (step S33). Then, the process goes to step S2. In contrast, if it is decided that the user does not touch on the "map" button switch, the processing operations (1) are ended as they are. Also, in step S31, if it is decided that the flag $f_1$ is not 1, the process goes to step S41 (FIG. 3).

In step S41, it is decided whether or not the flag $f_1$ indicating the state of the screen that is displayed on the display panel 9b is 2. Then, if it is concluded that the flag $f_1$ is 2 (i.e., as shown in FIG. 8, the map screen is displayed in the left half area of the display panel 9b and the real image is displayed in the remaining right half area), the current location information of own vehicle are calculated based on the GPS signal and the like (step S42). Then, the map screen showing the neighborhood of the current location of own vehicle is displayed in the left half area of the display panel 9b based on the calculated current location information of own vehicle and the map data stored in the RAM 1a (step S43). That is, the map screen is updated to meet to the moving of the vehicle.

Then, it is decided whether or not the flag $f_3$ indicating that the "detail" button switch is formed is 1 (step 44). Then, if it is concluded that the flag $f_3$ is 1 (i.e., the "detail" button switch is formed), it is decided whether or not the user touches on the "detail" button switch (step S45). Then, if it is concluded that the user touches the "detail" button switch, it is regarded that the user requests the real image as the detailed display. Thus, the real image showing the neighborhood of the current location of own vehicle (as the detailed display) is displayed in the right half area of the display panel 9b based on the current location information of own vehicle and the real image data (on the scale of 1.4 m per pixel dot) stored in the RAM 1a (step S46).

Then, the "detail" button switch is removed (step S47). The "wide area" button switch is formed instead of this (step S48). The flag $f_3$ is set to 0 (step S49). Then, the process goes to step S55. In contrast, in step S45, it is concluded that the user does not touch on the "detail" button switch, steps S46 to S49 are skipped and then the process goes to step S55 as it is.

Also, in step S44, it is concluded that the flag $f_3$ is not 1 (i.e., the "wide area" button switch is formed), it is decided whether or not the user touches the "wide area" button switch (step S50). If it is concluded that the user touches on the "wide area" button switch, it is regarded that the user requests the real image as the wide area display. Thus, the real image showing the neighborhood of the current location of own vehicle (as the wide area display) is displayed in the right half area of the display panel 9b based on the current location information of own vehicle and the real image data (on the scale of 2.8 m per pixel dot) stored in the RAM 1a (step S51).

Then, the "wide area" button switch is removed (step S52). The "detail" button switch is formed in place of the "wide area" button switch (step S53). The flag $f_3$ is set to 1 (step S54). The process goes to step S55. In contrast, in step S50, if it is concluded that the user does not touch on the "wide area" button switch, steps S51 to S54 are skipped and the process goes to step S55 as it is.

In step S55, it is decided whether or not the user pushes down the "two screen" button switch $8b_1$ provided on the remote controller 8. If it is concluded that the user pushes down the "two screen" button switch $8b_1$, it is regarded that the user requests the cancel of the two-screen display. Then, it is decided whether or not the flag $f_3$ is 1 (step S56).

If it is concluded that the flag $f_3$ is 1 (i.e., the "detail" button switch is formed), the "detail" button is removed (step S57). The flag $f_3$ is set to 0 (step S58). The process goes to step S2 (FIG. 2). In contrast, if it is concluded that the flag $f_3$ is not 1 (i.e., the "wide area" button switch is formed), the "wide area" button is removed (step S59). Then, the process goes to step S2.

Figure 4:
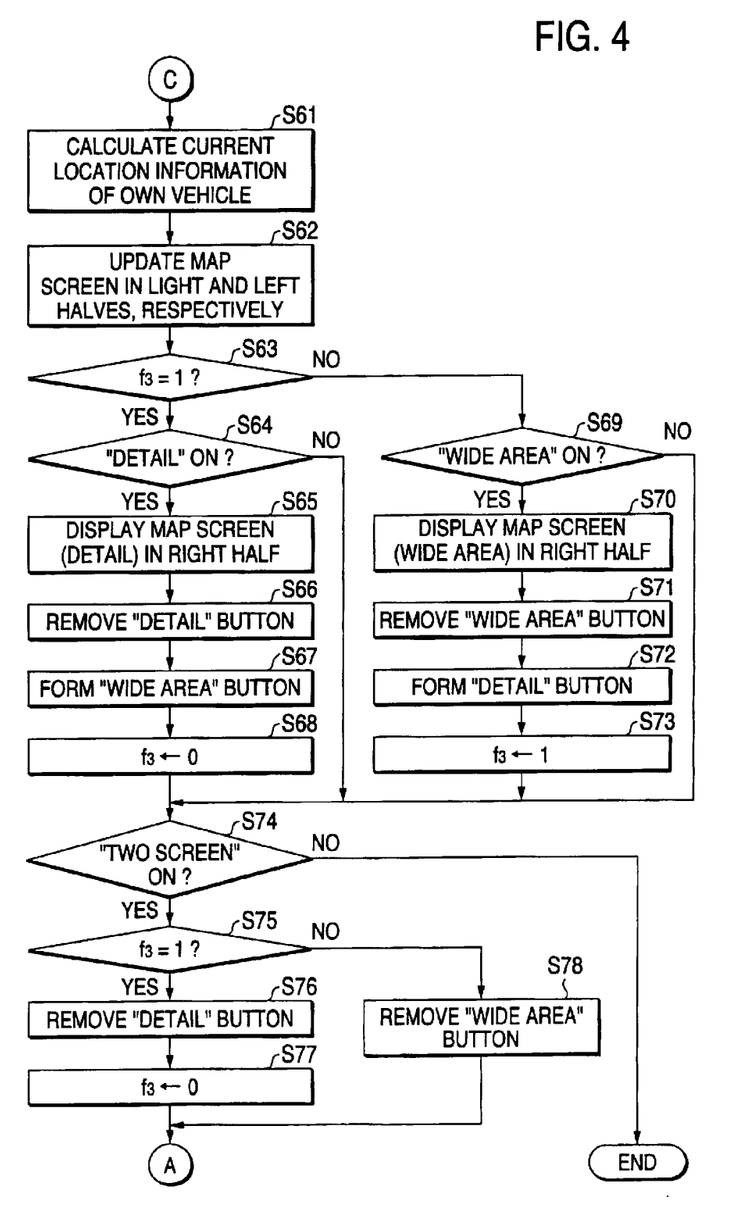
FIG. 4 is a flowchart showing processing operations executed by the microcomputer in the navigation apparatus according to the embodiment (1) of the invention.

Also, in step S41, it is concluded that the flag f, indicating the state of the screen that is displayed on the display panel 9b is not 2 (i.e., the flag $f_3$ is not any one of 0 to 2 but is 3, and as shown in FIG. 9, the map screen is displayed in the left half area of the display panel 9b and the map screen is displayed in the remaining right half area on another scale), the process goes to step S61 (FIG. 4).

In step S61, the current location of own vehicle is calculated based on the GPS signal and the like. Then, the map screens indicating the neighborhood of the current location of own vehicle are displayed in a predetermined scale in the left and right half areas of the display panel 9b, respectively based on the calculated current location information of own vehicle and the map data stored in the RAM 1a (step S62). That is, the map screens displayed in the left and right half areas thereof respectively are updated in response to the moving of own vehicle.

Then, it is decided whether or not the flag $f_3$ indicating that the "detail" button switch is formed is 1 (step S63). Then, if it is concluded that the flag $f_3$ is 1 (i.e., the "detail" button switch is formed), it is decided whether or not the user touches on the "detail" button switch (step S64). When it is concluded that the user touches on the "detail" button switch, it is regarded that the user requests the map screen as the detailed display. Thus, the map screen showing the neighborhood of the current location of own vehicle (as the detailed display) is displayed in the right half area of the display panel 9b based on the current location information of own vehicle and the map data stored in the RAM 1a (step S65).

Then, the "detail" button switch is removed (step S66). The "wide area" button switch is formed in place of the "detail" button switch (step S67). The flag $f_3$ is set to 0 (step S68). The process goes to step S74. In contrast, in step S64, it is concluded that the user does not touch the "detail" button switch, steps S65 to S68 are skipped and the process goes to step S74 as it is.

Also, in step S63, if it is concluded that the flag $f_3$ is not 1 (i.e., the "wide area" button switch is formed), it is decided whether or not the user touches on the "wide area" button switch (step S69). If it is concluded that the user touches on the "wide area" button switch, it is regarded that the user requests the map screen as the wide area display. Thus, the map screen showing the neighborhood of the current location of own vehicle (as the wide area display) is displayed in the right half area of the display panel 9b based on the current location information of own vehicle and the map data stored in the RAM 1a (step S70).

Next, the "wide area" button switch is removed (step S71). The "detail" button is formed instead of this (step S72). The flag $f_3$ is set to 1 (step S73). The process goes to step S74. In contrast, in step S69, it is concluded that the user does not touch on the "wide area" button, steps S70 to S73 are skipped and the process goes to step S74 as it is.

In step S74, it is decided whether or not the user pushes down the "two screen" button switch $8b_1$ provided on the remote controller 8. When it is concluded that the user pushes down the "two screen" button switch $8b_1$, it is regarded that the user requests the cancel of the two-screen display. Then, it is decided whether or not the flag $f_3$ is 1 (step S75).

If it is concluded that the flag $f_3$ is 1 (i.e., the "detail" button switch is formed), the "detail" button switch is removed (step S76). The flag $f_3$ is set to 0 (step S77). The process goes to step S2 (FIG. 2). In contrast, if it is concluded that the flag $f_3$ is not 1 (i.e., the "wide area" button switch is formed), the "wide area" button is removed (step S78). The process goes to step S2.

According to the navigation apparatus of the embodiment (1), the map screen can be displayed in the left half area on the display panel 9b, while the real image can be displayed in the right half area. Therefore, not only the map screen but also the real image such as the satellite photograph can be displayed on the display panel 9b. As a result, sufficient information can be offered to the user.

Also, when the display is switched from the state that the map screen is displayed on the overall screen of the display panel 9b (FIG. 6) to the state that the map screen is displayed in the left half area on the display panel 9b and the real image is displayed in the remaining right half area, the real image as the wide area display is displayed on the remaining right half area (FIG. 8). Therefore, even if the real image is displayed in the narrowed area such as the right half area on the display panel 9b, a lot of information can be offered to the user.

Also, if the display is switched from the state that the map screen is displayed on the overall screen of the display panel 9b (FIG. 6) to the state that the real image is displayed on the overall screen of the display panel 9b, the real image as the detailed display is displayed on the overall area (FIG. 7). That is, the scale of the real image is different from that in a case where the real image is displayed in the right half area on the display panel 9b. Therefore, more significant information can be offered to the user.

In the above described embodiment, the real image having a large scale and the real image having a small scale are switched and used for display in response to the selected button ("two screen", "satellite photograph", "detail", and "wide area"). However, in another embodiment, the microcomputer 1 may read only the real image data on one scale from the DVD-ROM 7 and store it in the RAM 1a. When it is required to change the scale of the displayed real image data, the microcomputer 1 may conduct enlargement/reduction processes on the stored real image data in response to the selected button and display the processed real image. In the another embodiment, an amount of the real image data stored in the RAM 1a is reduced to half in comparison with the embodiment (1). Therefore, the RAM 1a is used more effectively.

What is claimed is:

1. A navigation apparatus, comprising:
   a display unit on which first and second areas are defined; and
   a display control unit which includes a first display control section and controls the display unit to display at least one of a map screen and a real image, based on map data, real image data, and a present location, wherein:
   when a first instruction signal is input to the display control unit, the first display control section controls the display unit to display the map screen in the first area and the real image on one of first to n-th scales in the second area, where n is an integer not smaller than two.

2. The navigation apparatus according to claim 1, wherein the first area and the second area do not overlap each other.

3. The navigation apparatus according to claim 1, wherein the one of the first to n-th scales is smaller than the other scales.

4. The navigation apparatus according to claim 1, wherein when a second instruction signal is input to the display control unit, the first display control section changes the scale of the real image displayed in the second area.

5. The navigation apparatus according claim 1, wherein:
   a third area is defined on the display unit;
   the display control unit further includes a second display control section;
   when a third instruction signal is input to the display control unit, the second display control section controls the display unit to display one of the map screen and the real image in the third area;
   when the display unit displays the one in the third area and a fourth instruction signal is input to the display control unit, the second display control section changes the one of the map screen and the real image to the other.

6. The navigation apparatus according to claim 5, wherein the third area contains the first and second areas.

7. The navigation apparatus according to claim 5, wherein when the third instruction signal is input to the display control unit, the second display control section controls the display unit to display the real image on another of the first to n-th scales, which is different from the one of the first to n-th scales, in the third area.

8. The navigation apparatus according to claim 5, wherein when the display unit displays the real image in the third area and a fifth instruction signal is input to the display control unit, the second display control section changes the scale of the displayed real image.

* * * * *